United States Patent Office

3,247,271
Patented Apr. 19, 1966

**3,247,271
METHOD OF PRODUCING DIENES AND AROMATICS**
Werner O. Haag, Cherry Hill, and George W. Munns, Jr., West Deptford Township, Gloucester County, N.J., assignors to Socony Mobil Oil Company, Inc., a corporation of New York
No Drawing. Filed Sept. 13, 1963, Ser. No. 308,658
5 Claims. (Cl. 260—668)

This application is a continuation-in-part of our application Serial No. 129,513, filed August 7, 1961, now U.S. Patent No. 3,207,801.

This invention relates to the production of dienes from monoolefinic compounds, and further relates to the production of aromatic compounds from olefinic materials. More particularly, this invention relates to the thermal treatment of certain specified monoolefinic compounds to produce relatively high molecular weight dienes, and additionally relates to the production of aromatics from certain olefinic materials by thermally treating such olefinic material in the presence of a special narrow spectrum catalyst, namely, a high surface area carbon or an oxide, hydroxide, or salt of a metal such as magnesium, aluminum, zinc or calcium.

Low-molecular-weight dienes are commonly prepared by catalytic dehydrogenation. Relatively high-molecular-weight dienes, i.e., dienes which contain six or more carbon atoms, generally cannot be prepared in good yields by dehydrogenation because competing side reactions such as cracking, cyclization, etc., become dominant. Such high-molecular-weight dienes have, in the past, required special methods for preparation. The starting materials required for these methods are generally relatively expensive. For example, dienes may be prepared from diols by dehydration or from diacetates by pyrolysis. The preparation of these diene precursors is usually quite cumbersome, and the reactions usually yield mixtures of dienes. 1,5-hexadienes have been prepared by the reaction of metals such as sodium or magnesium with allylic halides. However, stoichiometric amounts of metals are required, and the separation of the desired 1,5-hexadienes from isomeric dienes and halogenated by-products and from the reaction media are costly operations. Corrosion may also be a serious problem when halogen compounds are present.

In accordance with one embodiment of the present invention, there is provided a simple method of obtaining high molecular weight dienes, which method is free from the foregoing disadvantages. This method comprises subjecting a specified monolefinic material to heat treatment under specified conditions of time and temperature to thereby pyrolize the monoolefinic material and effect the formation of the desired dienic materials.

Our invention also relates to the preparation of aromatic materials from certain specified olefinic materials.

Aromatic hydrocarbons are of considerable importance in modern-day technology. For example, ethyl benzene is needed in vast quantities for the manufacture of polystyrene; millions of pounds of naphthalene are consumed annually for the manufacture of alkyd resins; para-xylene is used in the production of terephthalic acid, etc.

The demand for each specific aromatic hydrocarbon has been met to a large extent by separating the desired aromatic from the complex mixture of hydrocarbon found either in coal tar or, in more recent years, reformed petroleum naphthas. While at times these sources have provided sufficient quantities of the aromatic as an inexpensive by-product, at other times shortages resulted due either to growth of demand or to curtailment of coking activity. Also, for some hydrocarbons, especially para-xylene, the cost of isolation from a complex mixture has been very high.

Several ways have been devised to augment the supply of aromatic hydrocarbons. Perhaps the most important of these is the commercial reforming of petroleum naphthas to manufacture high octane gasoline. In the latter process, a crude oil distillate is contacted with a catalyst of platinum metal dispersed on alumina to convert naphthenes to aromatic hydrocarbons. This process, however, is highly nonselective, and produces almost all the aromatic structures consistent with the boiling range of the reformate product. The non-selectivity is a characteristic of the platinum on alumina catalyst with exhibits a "wide spectrum" of activity. Such a catalyst, for example, is capable of isomerizing straight chain paraffins to branched chain paraffins, and is able to convert a pure para-xylene to an equilibrium mixture of all the xylenes and other aromatics. Such "wide-spectrum" behavior, while valuable for the manufacture of gasoline, is ill-suited for the preparation of specific aromatic hydrocarbons.

In a recent patent application, Serial No. 41,048, filed July 6, 1960, and now abandoned, there is described the use of certain "narrow-spectrum" catalysts to promote reaction between sulfur dioxide and certain paraffinic or olefinic hydrocarbons to produce aromatic hydrocarbons of predictable structures. Among the catalysts suitable for such reaction are solids such as magnesium oxide. The unusual selectivity is believed to derive essentially from the "narrow-spectrum" character of the catalyst. As an example of a narrow spectrum catalyst, in contrast with platinum on alumina, magnesium oxide does not catalyze the skeletal isomerization of either the charged hydrocarbon or the aromatics produced. Thus, the use of narrow-spectrum catalysts is well suited to the production of important specific aromatic hydrocarbons.

Unlike those catalysts which exhibit a wide spectrum of activity, narrow-spectrum catalysts are solids which are capable of eliminating hydrogen from cyclohexadiene, yet which are incapable of skeletally isomerizing paraffins or para-xylene.

In accordance with a second embodiment of our invention, there is provided a method for obtaining aromatics by dehydrocyclization of certain specified olefinic materials by heating such materials in the presence of a narrow-spectrum catalyst, namely, an oxide, hydroxide, or salt of a metal which is either magnesium, calcium, aluminum or zinc.

It is thus one of the objects of this invention to convert certain specified monoolefin materials to selected high-molecular weight dienes by simple pyrolysis.

It is another object of this invention to convert monoolefinic materials to selected high-molecular weight aliphatic dienes without requiring the removal of hydrogen.

A further object of this invention is to provide a novel process for the production of 1,5-hexadienes.

Another object is to convert 2,4,4-trimethyl pentenes to 2,5-dimethyl hexadienes.

A particular object is to convert 2,4,4-trimethyl-1-pentene (diisobutylene-1) to 2,5-dimethyl hexadine-1,5.

Another object is to produce such dienes in an economical manner from inexpensive and readily available raw materials.

Yet another object is to obtain such dienes along with a minimum of non-hydrocarbon by-products, and under such conditions as to permit steady and inexpensive recovery of the dienes.

An additional object of this invention is to provide a method for producing aromatics by dehydrocyclization of certain specified olefinic hydrocarbons in the presence of a narrow-spectrum catalyst.

Another object is to provide a highly selective method for the dehydrocyclization of certain specified olefinic hydrocarbons in the presence of a narrow-spectrum catalyst whereby selected aromatics are formed.

Additional objects will become apparent hereinafter.

In accordance with one embodiment of our invention we have found that valuable dienes may be easily prepared by the simple pyrolysis of a suitable monoolefin. Catalysts are not required in practicing this embodiment of our invention.

The monoolefinic reactant employed in the practice of our invention may be defined by the formula

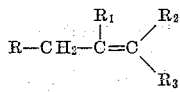

wherein R is a secondary or tertiary alkyl radical, wherein $R_1$, $R_2$, and $R_3$ may each be hydrogen, alkyl, aryl, cyano, carboalkoxy, or halogen, and wherein any two of the three radicals $R_1$, and $R_2$ and $R_3$, may be joined in a 4 to 6 membered carbocyclic ring.

The reaction to form the dienic material appears to be as follows:

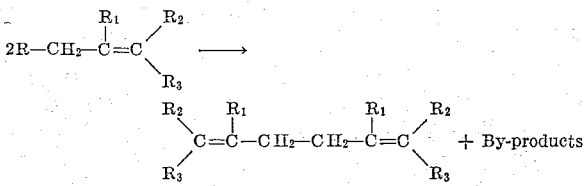

As has been pointed out, the process of this embodiment of the present invention is essentially a simple pyrolysis reaction. The specific conditions may be varied widely, depending upon the particular reactants employed, the processing techniques, and the like.

The raw materials are readily available or are easily prepared, and are inexpensive, especially as compared to prior-art reactants. The apparatus used is quite simple and continuous operation of the process is obviously subject to easy automation. The reactants usually are liquid and the resulting dienes most often are liquids and are relatively free from by-products, most of the latter being gaseous and hence removable from the reaction without contaminating the desired end products. Any unconverted olefinic materials are easily separated and may be recirculated or subjected to such other further treatment as may be desired.

Compounds suitable for the production of dienes according to the process of this embodiment of our invention are olefinic hydrocarbons and other olefinic compounds according to the general formula set forth hereinbefore. Thus, typical reactants which are suitable include 2,4,4-trimethyl pentene-1 (diisobutylene-1), 2,2,4,6,6-pentamethyl heptene (triisobutylene-3), 1-methyl-1-allyl-cyclopentane, 2-phenyl-4, 4-dimethyl pentene-1, 2-chloro-4, methyl hexene-1, β-isobutylacrylonitrile, 2,4-diphenyl-4-methyl pentene-1, etc.

For best results, it is generally preferred that an olefinic compound be used in which the double bond (—C=C—) is separated from the secondary or tertiary radical R by a single methylene group. However, compounds with the double bond in some other position or mixtures of double bond isomers are also operative. When the double bond is not in the preferred position, improved yields can be obtained by using a catalyst which promotes double bond isomerization. It is desirable that such catalysts should have high selectivity for double bond shift but should not cause undesirable side reactions such as cracking, skeletal isomerization, etc. Magnesium oxide has been found to be excellently suited for this purpose.

The reaction conditions may vary within wide limits, although any given reactant will generally have its optimum conditions. The temperature at which the pyrolysis is carried out may vary from about 660 to 1850° F., and is preferably from about 750 to 1200° F. A particularly preferred range is from about 930 to 1100° F. The dwell or residence time is also subject to variations depending on the specific monoolefin employed and the temperature of operation. Naturally, the higher the temperature, the shorter the residence time. In general, the residence time is from about 0.1–100 seconds, and preferably from about 1 to 20 seconds, although when using extremely high temperatures, i.e. of the order of 1300° F. or higher, it is in the order of milliseconds.

The pyrolysis may be carried out at atmospheric pressure or in a wide range of pressures from about 10 mm. of mercury up to about 100 atmospheres, pressures of about 100 mm. of mercury to about 10 atmospheres being preferred.

The olefinic reactants may be used alone or in admixture with relatively inert substances such as paraffinic hydrocarbons, benzene, nitrogen, helium, carbon monoxide, and the like. The reaction tube may be used as is, although superior results may be obtained when small particles of a suitable heat transfer material are disposed in the tube. Normally, a solid heat transfer material is used which is substantially inert, i.e., which has little or no catalytic activity with respect to the pyrolysis reaction. However, as shown in Example 4 hereinafter, it may be desirable to employ a solid which serves to catalyze the in situ formation of the desired reactant, e.g., as with magnesia which serves as a double bond isomerizing agent. Typical inert solids include particles of Pyrex glass, Vycor, quartz, corundum, copper, and the like. The solid particles may be used in a fixed bed, a fluidized bed, or in a raining-solids type operation. For operation at very high temperatures and very short reaction times, the use of a so-called slot-reactor is of particular advantage in that it permits a rapid heating of the reactants and quenching of the products.

The dienes produced by this embodiment of our invention may be used for many purposes. Thus, from such dienes there can be manufactured many resins and polymers which are valuable for the preparation of fibers and filaments. The dienes can undergo the oxo-reaction to form diols useful as solvents or as intermediates in the manufacture of other resins. Of particular interest is the fact that 2,5-dimethyl-hexadienes can be selectively converted to p-xylene which is essentially free of m-xylene, thereby avoiding the necessity of the usual costly separation of the two isomers by crystallization. The 1,5-dienes can be selectively isomerized to conjugated dienes which have many useful applications, e.g., reaction with maleic anhydride. Typically, 2,5-dimethyl-1,5-hexadiene can be converted to 2,5-dimethyl-2,4-hexadiene. The latter material can be polymerized to high-melting point and high-molecular-weight polymers using an appropriate catalyst, e.g., boron trifluoride catalyst, as described in U.S. Patent No. 3,019,213.

In accordance with a second embodiment of our invention, we have found that certain olefinic materials, e.g. hydrocarbons and substituted hydrocarbons, can be converted to desired aromatics by means of heat in the presence of a narrow-spectrum catalyst, namely, a high surface area carbon or a metal compound wherein the metal portion is either magnesium, aluminum, zinc, or calcium. Such catalysts function in a highly selective manner as dehydrocyclization catalysts for the olefinic hydrocarbons, so that selected aromatics will result therefrom. When a metal compound is used as the narrow-spectrum catalyst it may be either an oxide, hydroxide, or salt of an acid characterized by a dissociation constant of less than $1 \times 10^{-2}$, so that such metal salts as carbonates, sulfides, sulfites, acetates, and oxalates are suitable.

We have found that hydrocarbons and/or substituted hydrocarbons which contain at least one olefinic double bond and a sequence of carbon atoms capable of forming a benzenoid ring by the closure of not more than one carbon-carbon bond or compounds capable of forming olefinic hydrocarbons containing such a sequence of carbon atoms may be converted to aromatic hydrocarbons in a highly selective manner by contacting the olefinic hydrocarbon at elevated temperatures with such narrow-spectrum catalyst. The narrow-spectrum catalyst is capable of a highly selective sustained activity for the release of molecular hydrogen when brought into contact at elevated temperatures with a hydrocarbon of the type described. It should be emphasized that the narrow-spectrum catalyst, under the conditions required to form aromatic hydrocarbons, shows little activity for the rearrangement or regrouping of carbon atoms either within or among hydrocarbon molecules other than that required to form an aromatic ring.

Pure hydrocarbons which may be used include specifically (a) diisobutylene (2,4,4-trimethyl pentene) and (b) those hydrocarbons which contain a sequence of carbon atoms capable of forming a benzene ring by closure of not more than one carbon-carbon bond and hydrogen abstraction. Mixtures of hydrocarbons, providing at least one of their number meets the aforementioned requirements, may be utilized.

Examples of typical materials which may be used include octene-1; hexene-2; 2,5-dimethylhexene-2; 2,5-dimethyl hexadiene-1,5; 2,5-dimethyl hexadiene-2,4; 1,5-hexadiene; 2,4-hexadiene; cyclohexene; cyclohexadiene; vinylcyclohexene; hexyne; isobutylene trimers; 1-phenyl-butene-3; limonene and the double-bond isomers thereof; etc.

If 1-phenyl butene-3 is the olefin, then the closure of the olefinic side chain on the aromatic nucleus forms a second ring, as shown.

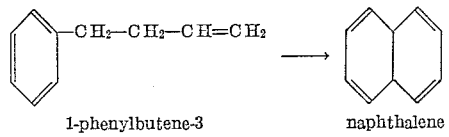

1-phenylbutene-3      naphthalene

Complex hydrocarbon mixtures may be treated by the process of this embodiment to effect aromatization. Such charges include naphthas of various types which contain substantial quantities of olefins.

Another class of hydrocarbons of special interest includes those materials not containing a six membered chain but which nevertheless are capable of forming aromatics. An example of this class is diisobutylene (2,4,4-trimethyl pentene). The conversion of diisobutylene is found to produce substantial quantities of para-xylene as the only 8-carbon aromatic. As was pointed out with respect to the preceding embodiment relating to pyrolysis of monoolefins to produce dienes, when the reactant is diisobutylene, there appears to be a thermal fragmentation, such that these fragments recombine to produce substantial quantities of 2,5-dimethyl hexadiene, that is, an olefinic hydrocarbon having a sequence of carbon atoms capable of forming a benzenoid ring by the closure of not more than one carbon-carbon bond. The hexadiene is then converted catalytically to the para-xylene by the narrow-spectrum catalyst.

Diene or polyene hydrocarbons, either aliphatic or cycloaliphatic, are well suited as charge materials for aromatization in accordance with this embodiment of our invention. Of particular interest is the exclusive formation of para-xylene from dienes such as

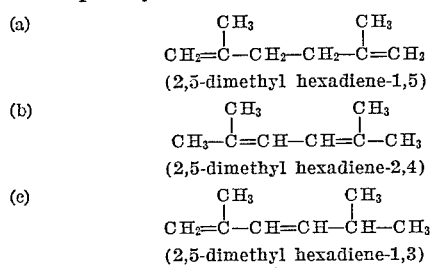

Para-xylene, a particularly valuable aromatic, is readily separated in high purity from other products due to the substantial absence of meta-xylene.

As stated previously, the narrow-spectrum catalysts of the present invention include, in addition to high surface area carbons, metal oxides, hydroxides, and salts (e.g., sulfides, carbonates, sulfites, acetates, oxalates, etc.) of acids characterized by a dissociation constant of less than $1 \times 10^{-2}$, wherein the metal portion is either magnesium, aluminum, zinc, or calcium. Generally, we prefer to use a metal oxide as the catalyst. When alumina is used as the narrow-spectrum catalyst it is desirable that such acid-inducing impurities as silica and/or halogens be essentially absent therefrom. Aluminas prepared in the presence of silica, for example, exhibit considerable activity for the rearrangement of carbon skeletons, cracking, polymerization, etc. and are not narrow-spectrum catalysts. In contrast, aluminas prepared in such a manner as to exhibit a highly selective, sustained activity for the release of molecular hydrogen from olefins and diolefins at elevated temperatures, however, are suitable for the process of this invention. Such aluminas can be prepared, for example, by impregnating a high-purity alumina with an alkali metal compound such as a hydroxide, carbonate, sulfide, oxalate, or the like in an amount of from about 0.1 to 1.5 grams of alkali metal ion per 100 grams of alumina, drying, and calcining. Or, alternatively, a "non-narrow spectrum" alumina can be treated, either prior to or during the catalytic reaction, at the reaction temperature with a small amount of an amine such as ammonia, methylamine, trimethylamine, pyridine, quinoline, etc. to thereby neutralize any acid-inducing impurities.

The activity of the narrow-spectrum catalysts of our invention generally is favored by increased surface area. Of course, the surface area range will vary depending upon the nature of the particular narrow-spectrum catalyst used. The following ranges are typical for the various narrow-spectrum materials:

| Material: | Surface area (square meters/gram) |
|---|---|
| Carbon | 500 to 1500 |
| Magnesia | 1 to 200 |
| Alumina | 100 to 700 |
| Zinc oxide | 0.01 to 10 |
| Calcium oxide | 0.01 to 5 |

At the elevated temperatures required for this embodiment of our invention, many salts (such as carbonates, acetates, sulfides, oxalates, etc.) are converted to the corresponding oxides, hydroxides, and carbonates, or mixtures thereof.

Naturally occurring minerals provide abundant and inexpensive selective catalysts. These minerals include dolomite, from which magnesia may be extracted, magnesite, etc. The surface area required for effective catalysis is considerably less than 100 m.²/g. However, lower surface area materials will of course have a lower activity level.

The metal compound narrow-spectrum catalysts, when rendered inactive by the accumulation of coke deposits, may be regenerated by conventional methods, e.g., by heating in air at a temperature of from about 1000–1300° F. to burn off the coke.

The dehydrocyclization may be carried out by passing the hydrocarbon charge in vapor form over a heated catalyst bed, wherein the catalyst is a narrow-spectrum catalyst as previously defined. The temperature at which the bed is maintained may vary from about 700° F. to about 1300° F. More preferably, the range is from about 900° F. to 1100° F. so as to minimize the formation of gaseous by-products while at the same time maintaining a reasonable level of conversion.

Pressure in the reaction zone may vary within wide limits, e.g., from a sub-atmospheric pressure of virtually zero pounds per square inch absolute, i.e., 10 mm. of mercury, up to about 1000 p.s.i.a. A more preferred pressure range is from about atmospheric to about 500 p.s.i.a.

In the practice of this embodiment of our invention the L.H.S.V. (Liquid Hourly Space Velocity) of the hydrocarbon charge may vary from about 0.2 to 20. A more preferred range is an L.H.S.V. of from about 0.5 to 3.0.

Instead of a fixed catalyst bed, a fluidized bed may be substituted. The latter may provide better yields of desired products in some cases. Another variant of this invention contemplates the use of a raining solids bed, again to better control the temperature and selectivity for desired products.

This second embodiment of our invention may be used to convert low grade olefinic hydrocarbons to specific aromatic compounds useful in a wide variety of applications, e.g., as solvents, high grade fuel components, and especially as chemical intermediates for the manufacture of plastics, rubbers, and detergents.

The following examples will further illustrate our invention. All parts are by weight unless otherwise stated.

Examples 1–3 illustrate the first embodiment of our invention, wherein by heating, in the absence of a catalyst, a specified monoolefin is converted to a desired diene.

*Example 1.*—This example illustrates the conversion of 2,4,4-trimethyl pentene-1 to 2,5-dimethyl hexadiene-1,5. A vertically positioned cylindrical glass tube is provided as the reaction chamber. The tube is heated by an electric furnace. The tube is filled with small particles of Vycor, as an inert heat transfer material and is heated to an internal temperature of about 1000° F. The reactant, namely, liquid 2,4,4-trimethyl pentene-1 (diisobutylene-1) is introduced into the top of the tube through a suitable feed device. Reaction products are withdrawn at the bottom of the tube and are passed consecutievly through a water-cooled condenser and an ice-cooled trap for recovering the liquid products. Exit gases were vented, but if desired, could have been further treated. With a residence time of 5.0 seconds in the tube at about 1000° F., 46.6% of the diisobutylene is converted and 22 parts of 2,5-dimethyl hexadiene-1,5 are obtained from each 100 parts of diisobutylene so converted. Similarly, with a reaction temperature of about 930° F. and with a residence time of 5.3 seconds, 23.7% of the diisobutylene is converted and 24 parts of 2,5-dimethyl hexadiene-1,5 are formed for each 100 parts of the diisobutylene so converted. The pyrolysis reaction may be illustrated as follows:

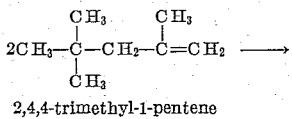

2,4,4-trimethyl-1-pentene $$CH_2=\underset{\underset{CH_3}{|}}{C}-CH_2-CH_2-\underset{\underset{}{|}}{C}=CH_2 + \text{By-products}$$

2,5-dimethyl-1,5-hexadiene

Most of the by-products are normally gaseous hydrocarbons which are rich in isobutylene which can readily be dimerized to 2,4,4-trimethylpentene and recycled.

*Example 2.*—2-phenyl-4,4-dimethyl-1-pentene is passed through the reactor of Example 1 at about 538° C. at such a rate that residence time is about 5 seconds. The liquid reaction product is separated from the gases produced by condensation in a water-cooled condenser and an ice-cooled trap. The liquid product, in addition to unreacted starting material, contains appreciable amounts of the desired product, namely, 2,5-diphenyl-1,5-hexadiene. This product is readily obtained in pure form, e.g., by distillation.

*Example 3.*—When the linear dimer of α-methylstyrene, 2,4-diphenyl-4-methyl-pentene containing a large proportion of the isomer with a terminal double bond, is substituted as the charge material in Example 2, there is likewise recovered from the liquid product significant amounts of the desired 2,5-diphenyl-1,5-hexadiene.

*Example 4.*—2,4,4-trimethyl pentene-2 (diisobutylene-2) is used rather than the diisobutylene-1 of Example 1. The residence time is 3.3 seconds and the internal temperature is about 1000° F. A conversion of about 23% of the diisobutylene-2 is achieved and about 1.4 parts of 2,5-dimethyl hexadiene-1,5 are obtained for 100 parts of diisobutylene-2 converted. However, when Vycor is replaced by magnesium oxide particles, the equipment otherwise remaining the same, much improved results are obtained. Thus, with a residence time of about 6.4 seconds and an internal temperature of about 930° F., about 26% of the diisobutylene-2 are converted and 14.3 parts of 2,5-dimethyl-1,5-hexadiene are obtained per 100 parts of diisobutylene-2 converted. These results indicate that the magnesium oxide brings about a shift of the double bond of the diisobutylene from the 2 position to the 1 position.

The following examples illustrate the second embodiment of our invention, wherein a narrow-spectrum catalyst is employed. In these examples, the catalysts were formed into one-eighth inch pellets for convenience in handling. Generally 10 percent stearic acid was used to assist in pelleting. In each instance the catalyst was heated in air at from 1200° F. to 1300° F. to decompose surface carbonates and stearic acid binder.

*Examples 5–24.*—The charge stock was passed at 1

*Table I.—Aromatization over extra light magnesia catalyst*
[L.H.S.V.=1]

| Example Number | Charge Stock | Temperature, °F. | Product Analysis, Wt. Percent Based on Charge | | | | | | | | Total Yield of Aromatics, wt. percent of Total Yield |
|---|---|---|---|---|---|---|---|---|---|---|---|
| | | | Benzene | Toluene | p-Xylene | m-Xylene | o-Xylene | Ethyl benzene | Other Aromatics | Total Aromatics | |
| 5 | Octene-1 | 1,000 | 1.5 | 2.8 | [2] 0.3 | | 5.8 | 3.9 | | 14.3 | 19.0 |
| 6 | 2-methyl-1,5-hexadiene | 930 | | 0.5 | [2] Trace | | 0.3 | | | 0.8 | 1.6 |
| 7 | do | 1,000 | 0.2 | 15.5 | [2] 0.3 | | 0.2 | | | 16.2 | 16.5 |
| 8 | 2,5-dimethyl-2,4-hexadiene | 930 | Nil | 1.1 | 18.1 | Nil | Nil | Nil | | 19.2 | 29.4 |
| 9 | do | 1,000 | 1.7 | 6.2 | [2] 19.0 | | 1.8 | Nil | | 28.7 | 31.7 |
| 10 | 2,5-dimethyl-1,5-hexadiene | 930 | | 1.6 | 7.8 | 0.6 | Nil | Nil | | 10.0 | 10.6 |
| 11 | do | 1,000 | 0.1 | 3.4 | [2] 24.9 | | 1.0 | Nil | | 29.4 | 30.2 |
| 12 | 2,4-hexadiene | 930 | 12.6 | 1.2 | C₈ Aromatics=0.9 | | | | 2.2 | 16.9 | 20.3 |
| 13 | do | 1,000 | 20.0 | 2.5 | C₈ Aromatics=1.7 | | | | 3.2 | 27.4 | 29.9 |
| 14 | 1,5-hexadiene | 930 | 9.9 | 0.9 | C₈ Aromatics=0.6 | | | | 3.2 | 14.6 | 18.8 |
| 15 | do | 1,000 | 12.6 | 1.7 | C₈ Aromatics=0.8 | | | | 1.8 | 16.9 | 18.1 |
| 16 | 2,4,4-trimethyl pentene-1 | 930 | 0.7 | 0.5 | 0.3 | 0.1 | Nil | Nil | | 1.6 | 3.1 |
| 17 | do | 1,000 | 1.8 | 0.6 | 6.2 | 0.3 | Nil | Nil | | 8.9 | 10.9 |
| 18 | 2,4,4-trimethyl pentene-2 | 930 | Nil | Nil | [2] 0.7 | | Nil | Nil | | 0.7 | 1.0 |
| 19 | do [1] | 1,000 | Nil | 1.0 | [2] 9.7 | | Nil | Nil | | 10.7 | 12.9 |
| 20 | Cyclohexene | 930 | 1.1 | 0.2 | | | | | | 1.3 | 6.3 |
| 21 | do | 1,000 | 11.9 | 0.4 | | | | | | 12.3 | 38.9 |
| 22 | Cyclohexadiene-1,3 | 930 | 85.5 | | | | | | | 85.5 | 93.2 |
| 23 | n-Octane | 1,000 | Nil | Nil | Nil | Nil | Nil | Nil | | Nil | Nil |
| 24 | Cyclohexane | 1,000 | | | | | | | | Nil | Nil |

[1] A similar experiment using 0.5 L.H.S.V.; 1,000° F., etc. gave a total of 10.5% aromatics, of which 10.4% was p/m xylenes.
[2] p/m distribution not determined.

L.H.S.V. (cc. per cc. catalyst per hour) over a catalyst bed of ⅛" pellets of magnesium oxide which was heated by a block to the temperature indicated with an electronically controlled heater. The catalyst was purged with nitrogen before the hydrocarbon was introduced. Gaseous products were condensed with a water condenser and the uncondensed gases passed through an ice trap and either collected in a gaseous receiver or measured through a wet test meter. The results are tabulated in Table I.

While the percent yield of aromatics varies considerably, generally yields of 10 percent or higher were obtained. It will be noted that when the initial charge was a paraffin rather than an olefin (Examples 23 and 24), no aromatics were found.

*Examples 25–31.*—The procedure used was the same as that described for Examples 5–22, however, the catalyst composition was varied as shown in Table II. The hydrocarbon charge was diisobutylene (2,4,4-trimethyl pentene-1) in all instances. The results are tabulated in Table II.

*Example 32.*—This example illustrates the use of an activated carbon catalyst. 7.7 grams of activated carbon were placed in a tube reactor and heated to 1050° F. in a nitrogen atmosphere. Then, 12 grams of heptene-1 were passed over the catalyst maintained at 1050° F. over a one hour period. About three grams of liquid were recovered, 50% of this being toluene.

*Example 33.*—This example illustrates the conversion of diisobutylene over activated carbon. The catalyst and conditions used in Example 32 were used in the present example, except that diisobutylene was substituted for the heptene-1. About 1.4 grams of liquid were recovered, which analyzed 70% xylene. Independent analysis by infra-red showed that the xylene was essentially free of meta-isomer.

*Example 34.*—This example illustrates the conversion of triisobutylene to aromatic hydrocarbons. The procedure used was similar to that described for Examples 5–22. 13.5 grams of magnesium oxide (extra-light grade) were charged to the reactor. Twelve grams of triisobutylene were passed over the catalyst, which was maintained at 1050° F., during a one hour period. About 1.5 grams of liquid were recovered, which analyzed 63% xylenes.

Of course, variations can be made based on the teachings of the above disclosure without departing from the spirit of our invention.

Having thus described our invention, what we desire to secure and claim by Letters Patent is:

1. A process for the preparation of a 1,5-diene selected from the group consisting of (a) 2,5-dimethyl hexadiene-1,5 and (b) 2,5-diphenyl-1,5-hexadiene which comprises heating at a temperature between about 660° F. and about 1850° F. (A) 2,4,4-trimethyl pentene-1 to yield 2,5-dimethyl hexadiene-1,5 or (B) 2-phenyl-4,4-dimethyl pentene-1 or 2,4-diphenyl-4-methyl pentene-1 to yield 2,5-diphenyl-1,5-hexadiene and recovering the aforesaid 1,5-diene product.

2. A process for the preparation of 2,5-dimethyl hexadiene-1,5 which comprises heating 2,4,4-trimethyl pentene-1 at a temperature between about 660° F. and about 1850° F. and recovering 2,5-dimethyl hexadiene-1,5 from the resulting product.

3. A process for the preparation of 2,5-diphenyl-1,5-hexadiene which comprises heating 2-phenyl-4,4-dimethyl pentene-1 at a temperature between about 660° F. and about 1850° F. and recovering 2,5-diphenyl-1,5-hexadiene from the resulting product.

4. A process for the preparation of 2,5-diphenyl-1,5-hexadiene which comprises heating 2,4-diphenyl-4-methyl pentene-1 at a temperature between about 660° F. and about 1850° F. and recovering 2,5-diphenyl-1,5-hexadiene from the resulting product.

5. The process of claim 1, wherein said heating is carried out at a temperature between about 750° F. and about 1200° F. and in the presence of a substantially inert solid which serves as a heat transfer agent.

*Table II.—Aromatization of diisobutylene over various catalysts*
[L.H.S.V.=1, Temp.=1000° F.]

| Example Number | Catalyst | Product Analysis, wt. percent Based on Charge | | | | | | | Total Yield of Aromatics, wt. percent of Total Yield |
|---|---|---|---|---|---|---|---|---|---|
| | | Benzene | Toluene | p-Xylene | m-Xylene | o-Xylene | Ethyl Benzene | Total Aromatics | |
| 25 | U.S.P. MgO | Nil | Nil | [1]1.5 | | Trace | Nil | 1.6 | 1.9 |
| 26 | Dolomite | Nil | 0.5 | [1]2.0 | | 0.3 | Nil | 2.8 | 3.5 |
| 27 | Hi Surface Area Magnesia | Nil | 0.6 | [1]4.3 | | Nil | Nil | 4.9 | 6.4 |
| 28 | Calcium Oxide | Nil | 0.2 | [1]0.5 | | Nil | Nil | 0.7 | 1.5 |
| 29 | Zinc Oxide | Nil | 0.3 | 4.6 | 0.2 | Nil | Nil | 5.1 | 8.0 |
| 30 | Aluminum oxide (⅛" pellets) | Nil | 0.3 | [1]1.0 | | Trace | Nil | 1.3 | 1.6 |
| 31 | Lime | Nil | 0.4 | [1]3.3 | | Nil | Nil | 3.7 | 4.7 |

[1] p/m distribution not determined.

References Cited by the Examiner

UNITED STATES PATENTS

| 1,851,726 | 3/1932 | Pier et al. | 260—673 |
| 1,863,212 | 6/1932 | Winkler | 260—673 |
| 2,378,209 | 6/1945 | Fuller | 260—673.5 |
| 2,423,418 | 7/1947 | Stone et al. | 260—680 |
| 2,785,209 | 3/1957 | Schmetterling et al. | 260—673.5 |
| 2,804,487 | 8/1957 | Donkle | 260—680 |
| 2,898,388 | 8/1959 | Maloney et al. | 260—673.5 |
| 2,941,016 | 6/1960 | Schmetterling et al. | 260—673.5 |
| 2,985,693 | 5/1961 | Probst et al. | 260—673.5 |

FOREIGN PATENTS

| 588,870 | 7/1960 | Belgium. |
| 1,251,127 | 12/1960 | France. |
| 832,475 | 4/1960 | Great Britain. |
| 868,566 | 1/1960 | Great Britain. |

ALPHONSO D. SULLIVAN, *Primary Examiner.*

D. S. ABRAMS, *Assistant Examiner.*